United States Patent
Li et al.

(10) Patent No.: US 11,303,019 B2
(45) Date of Patent: Apr. 12, 2022

(54) TRANSMISSION DEVICE FOR ANTENNA PHASE SHIFTER

(71) Applicant: Rosenberger Technologies Co., Ltd, Suzhou (CN)

(72) Inventors: Yongzhong Li, Suzhou (CN); Zhonghao Zou, Suzhou (CN)

(73) Assignee: ROSENBERGER TECHNOLOGIES CO., LTD, Suzhou (CN)

( * ) Notice: Subject to any disclaimer, the term of this patent is extended or adjusted under 35 U.S.C. 154(b) by 129 days.

(21) Appl. No.: 16/813,929

(22) Filed: Mar. 10, 2020

(65) Prior Publication Data

US 2020/0212565 A1    Jul. 2, 2020

Related U.S. Application Data

(63) Continuation of application No. PCT/CN2018/107606, filed on Sep. 26, 2018.

(30) Foreign Application Priority Data

Nov. 7, 2017 (CN) .......................... 201711085332.4

(51) Int. Cl.
*H01Q 3/32* (2006.01)
*F16H 1/20* (2006.01)
(Continued)

(52) U.S. Cl.
CPC ............... *H01Q 3/32* (2013.01); *F16H 1/20* (2013.01); *F16H 1/203* (2013.01); *F16H 19/04* (2013.01);
(Continued)

(58) Field of Classification Search
CPC ....... F16H 2025/209; F16H 2025/2084; F16H 19/04; F16H 1/203; H01Q 3/32
See application file for complete search history.

(56) References Cited

U.S. PATENT DOCUMENTS 6,239,744 B1 * 5/2001 Singer .................... H01Q 1/246
                                          342/359
2016/0352011 A1 * 12/2016 Duan ........................ H01Q 3/32
(Continued)

FOREIGN PATENT DOCUMENTS

CN    102496769 B    11/2013
CN    204577599 U    8/2015
(Continued)

OTHER PUBLICATIONS

International Search Report of PCT/CN2018/107606, dated Dec. 13, 2018.

*Primary Examiner* — David M Fenstermacher
(74) *Attorney, Agent, or Firm* — Locke Lord LLP; Tim Tingkang Xia, Esq.

(57) ABSTRACT

Disclosed by the present invention is a transmission device for an antenna phase shifter, comprising a transmission input portion, a shift selection portion, and a transmission output portion; the transmission input portion is fully separated from the shift selection portion, by means of the shift selection portion, the transmission input portion establishes transmission connection with any output terminal of the transmission output portion, thereby performing phase adjustment on a phase shifter that is connected to the output terminal. In the present invention, two motors are responsible for power input and selection output respectively so as to select to drive any number of phase shifters; furthermore, the structure is compact, and output terminals of the transmission output portions may be spread out flat, being beneficial for antenna layout.

21 Claims, 7 Drawing Sheets

(51) Int. Cl.
*F16H 19/04* (2006.01)
*F16H 25/20* (2006.01)

(52) U.S. Cl.
CPC ....... *F16H 25/20* (2013.01); *F16H 2025/209* (2013.01); *F16H 2025/2084* (2013.01)

(56) References Cited

U.S. PATENT DOCUMENTS

| | | | | |
|---|---|---|---|---|
| 2017/0365923 A1* | 12/2017 | Schmutzler | ............ | F16H 25/20 |
| 2017/0373379 A1* | 12/2017 | Schmutzler | ............ | H01Q 3/32 |
| 2019/0331220 A1* | 10/2019 | Fu | ............ | H01P 1/18 |
| 2020/0212565 A1* | 7/2020 | Li | ............ | H01Q 1/246 |
| 2020/0220260 A1* | 7/2020 | Li | ............ | H01Q 1/246 |
| 2020/0388915 A1* | 12/2020 | Xu | ............ | H01Q 1/246 |
| 2020/0411962 A1* | 12/2020 | Lindmark | ............ | H01Q 21/06 |
| 2021/0159589 A1* | 5/2021 | Everest | ............ | H01Q 3/32 |
| 2021/0265728 A1* | 8/2021 | Thomas | ............ | H01Q 5/48 |

FOREIGN PATENT DOCUMENTS

| | | |
|---|---|---|
| CN | 207559071 U | 6/2018 |
| CN | 105720370 B | 1/2019 |
| KR | 101600832 B1 | 3/2016 |

\* cited by examiner

TRANSMISSION DEVICE FOR ANTENNA PHASE SHIFTER

CROSS REFERENCE TO RELATED APPLICATIONS

This application is a continuation of international application No. PCT/CN2018/107606, filed on Sep. 26, 2018, the disclosures of which are hereby incorporated by reference.

FIELD OF THE INVENTION

The present invention relates to a transmission device in a mobile communication antenna, and more particularly, to a transmission device for driving a phase shifter in a mobile communication antenna.

BACKGROUND

A radiation angle of a mobile communication antenna needs to be adjusted respectively according to a change of a main source of the antenna through driving a phase shifter in the antenna by a transmission device, so as to adjust the radiation angle. Multiple phase shifters often exist in one mobile communication antenna, and these phase shifters often need to be adjusted differently.

At present, most phase shifter driving devices in the market are one-to-one, one motor controls one phase shifter separately, multiple motors need to be provided to realize separate adjustment of the multiple phase shifters, and due to an expensive price and a heavy weight of the motor, not only the antenna is bulky, but also the cost is increased.

In order to solve the problem, people have also successively researched some phase shifter transmission devices with one motor driving multiple phase shifters and two motors driving multiple phase shifters. For example, the patent application number CN201610049909.5 discloses a solution with the title of antenna azimuth angle adjustment device. However, the solution has the following defects to be improved: 1. an overall transmission ratio of the solution is insufficient, and a motor is required to reduce a speed and increase a torque; 2. a gear is used to be meshed with a rack to change a transmission mode from rotation into translation, which has a risk of skipping; 3. power can be reversely transmitted from an output terminal (i.e., an adjustment driven device in the patent) to an input end (i.e., an adjustment driving device in the patent), which is easy to damage a structure; and 4. output ports are relatively concentrated and difficult to spread out, which is not beneficial for antenna layout.

SUMMARY OF THE INVENTION

The present invention is intended to overcome the defects of the prior art, and provides a transmission device for an antenna phase shifter which is compact in structure and beneficial for antenna layout.

In order to achieve the object above, the present invention provides the following technical solutions: a transmission device for an antenna phase shifter comprises a transmission input portion, a shift selection portion and a transmission output portion. the transmission input portion comprises a driving shaft, at least two driving gears axially and fixedly mounted on the driving shaft, and a first driving assembly in transmission connection with the driving shaft;

the shift selection portion comprises a screw rod, a transmission assembly mounted on the screw rod and a second driving assembly in transmission connection with the screw rod;

the transmission output portion comprises an output shaft and at least two output gear sets mounted on the output shaft, one output gear set corresponds to one driving gear on the driving shaft; and the first driving assembly drives the driving gear on the driving shaft to rotate synchronously, the second driving assembly drives the screw rod to rotate, the transmission assembly slides along an axial direction of the screw rod under drive of the screw rod and selects any driving gear on the driving shaft to establish transmission connection with one corresponding output gear set on the output shaft.

Preferably, the first driving assembly comprises a first motor, a first worm connected to the first motor and a first worm wheel meshed with the first worm, the first worm wheel is fixedly mounted on the driving shaft, the first motor drives the first worm to drive the first worm wheel to rotate, and the first worm wheel drives the driving shaft to drive the driving gear to rotate synchronously.

Preferably, the second driving assembly comprises a second motor, a second worm in transmission connection with the second motor and a second worm wheel meshed with the second worm, the second worm wheel is fixedly mounted on the screw rod, the second motor drives the second worm to rotate, and the second worm drives the second worm wheel to drive the screw rod to rotate.

Preferably, the second driving assembly further comprises a reversing gear set, the reversing gear set comprises a plurality of reversing gears, the reversing gears are meshed with each other, one of two outermost reversing gears is in transmission connection with the second motor, and the other is in transmission connection with the second worm.

Preferably, each output gear set of the transmission output portion moves relatively independently.

Preferably, the output gear set comprises a shaft sleeve sheathed on the output shaft, an output gear mounted on the shaft sleeve and an output assembly in transmission connection with the output gear, the output gear corresponds to the driving gear of the transmission input portion, and the shaft sleeve rotates synchronously with the output gear.

Preferably, the output assembly comprises a first output worm mounted on the shaft sleeve, a first output worm wheel meshed with the first output worm, and a second output worm in transmission connection with the first output worm wheel; and the first output worm rotates synchronously with the shaft sleeve, the first output worm drives the first output worm wheel to rotate, and the first output worm wheel drives the second output worm to rotate.

Preferably, the transmission assembly comprises a nut fixedly mounted on the screw rod and an idler gear mounted on the nut, the idler gear slides along an axial direction of the screw rod under drive of the nut, and selects to be simultaneously meshed with any driving gear on the driving shaft and the corresponding output gear on the output shaft to establish transmission connection.

Preferably, the screw rod is located between the driving shaft and the output shaft, and the screw rod, the driving shaft and the output shaft are all parallel to each other.

Preferably, each second output worm is provided with a rack meshed with the second output worm, and the rack has helical teeth and is connected to a phase shifter.

Preferably, one end of the nut is provided with a wing for limiting relative rotation of the nut and the idler gear.

Preferably, all tooth surfaces of the idler gear are provided with a chamfer.

Preferably, all tooth surfaces of the driving gear and the output gear are provided with a chamfer.

Preferably, a surface of the screw rod is provided with an external thread.

Preferably, the transmission input portion, the shift selection portion and the transmission output portion are mounted in a shell.

The present invention has the beneficial effects as follow.

1. According to the present invention, two motors are responsible for power input and selection output respectively so as to select to drive any number of the phase shifters, so that a use number of the motors can be effectively reduced, thereby having a compact structure and saving a space.

2. An output terminal may be spread out flat, being beneficial for antenna layout, and an output quantity can be increased or decreased as needed, so that the device has a strong versatility.

3. A whole reversing structure is transmitted by a worm wheel and a worm, which reduces mounting requirements, and a whole transmission process is transmitted from the worm to the worm wheel, thereby increasing a reverse transmission resistance. Finally, the output portion changes rotation into translation through a connection mode of the worm and a rack to prevent skipping, and at the same time, the transmission from the worm wheel to the worm has self-locking protection to prevent reverse transmission, thereby preventing a position change of the phase shifter and ensuring an adjustment accuracy of the phase shifter.

4. With a self-contained deceleration function, no additional motor deceleration device is required.

REFERENCE NUMERALS

100 refers to transmission input portion, 101 refers to driving shaft, 102 refers to driving gear, 103 refers to first motor, 104 refers to first worm, 105 refers to first worm wheel, 200 refers to shift selection portion, 201 refers to screw rod, 202 refers to second motor, 203 refers to second worm, 204 refers to second worm wheel, 205 refers to leftmost reversing gear, 206 refers to rightmost reversing gear, 207 refers to intermediate reversing gear, 208 refers to nut, 209 refers to idler gear, 210 refers to wing, 300 refers to transmission output portion, 301 refers to output shaft, 302 refers to shaft sleeve, 303 refers to output gear, 304 refers to first output worm, 305 refers to first output worm wheel, 306 refers to second output worm, 307 refers to rack, 308 refers to output gear set, and 400 refers to shell.

DETAILED DESCRIPTION OF THE PREFERRED EMBODIMENTS

The technical solutions of the embodiments of the present invention are clearly and fully described hereinafter with reference to the drawings of the present invention.

Figure 1:
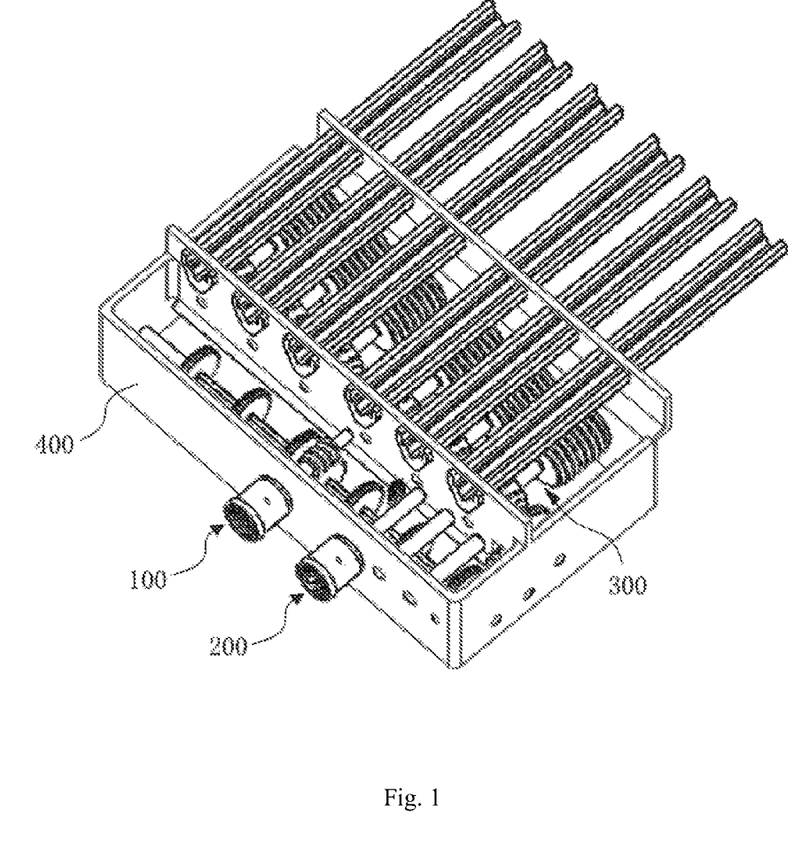
FIG. 1 is an overall structure diagram of the present invention after assembly.
Figure 2:
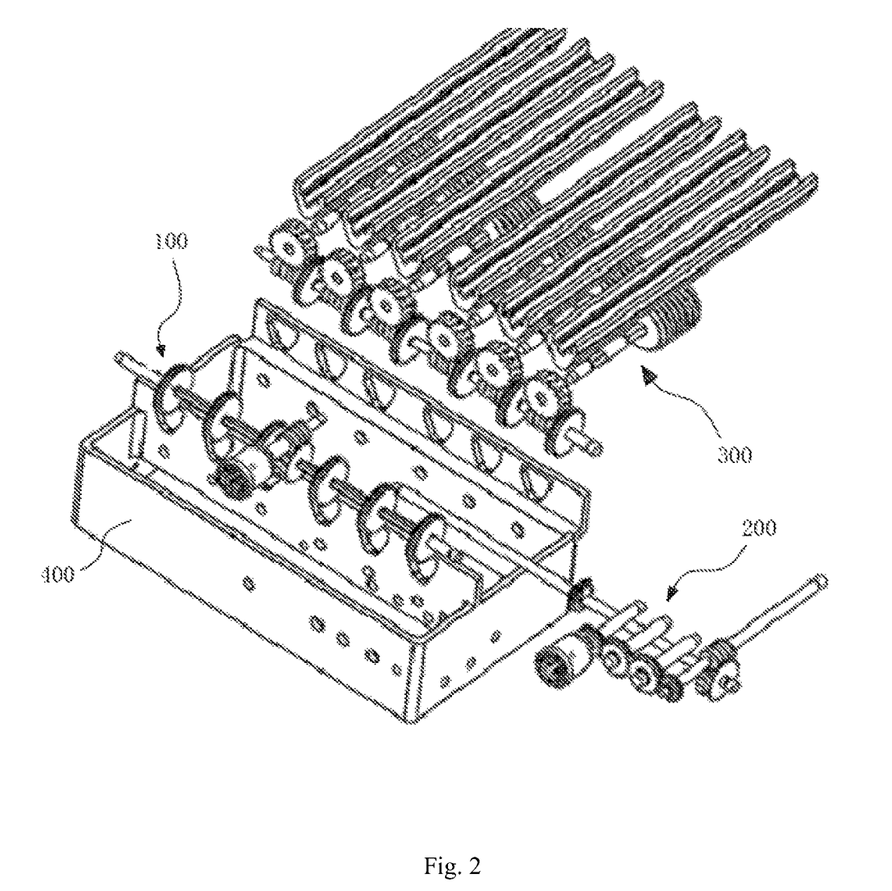
FIG. 2 is an explosive structure diagram of the present invention.
Figure 3:
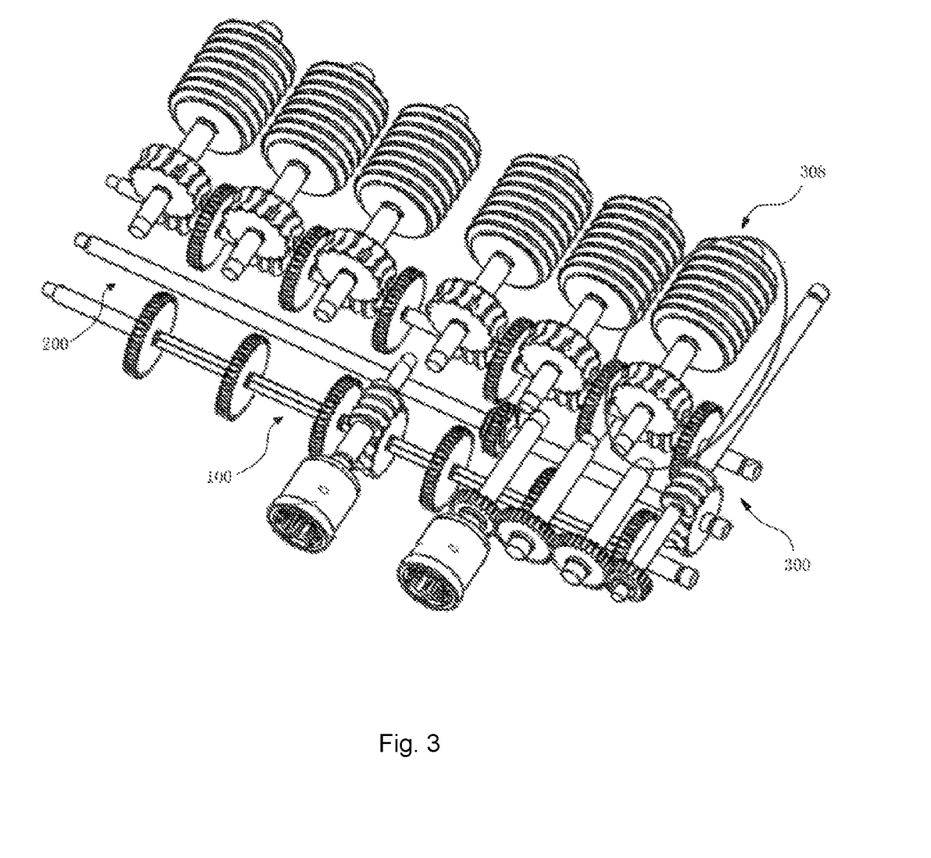
FIG. 3 is an overall structure diagram of the present invention after removing a shell.

With reference to FIG. 1 to FIG. 3, the embodiment of the present invention discloses a transmission device for an antenna phase shifter, which comprises a transmission input portion 100, a shift selection portion 200 and a transmission output portion 300, wherein the transmission input portion 100 is fully separated from the shift selection portion 200. By means of the shift selection portion 200, the transmission input portion 100 establishes transmission connection with any output terminal of the transmission output portion 300, thereby performing phase adjustment on a corresponding phase shifter (not shown) that is connected to the output terminal.

Figure 4:
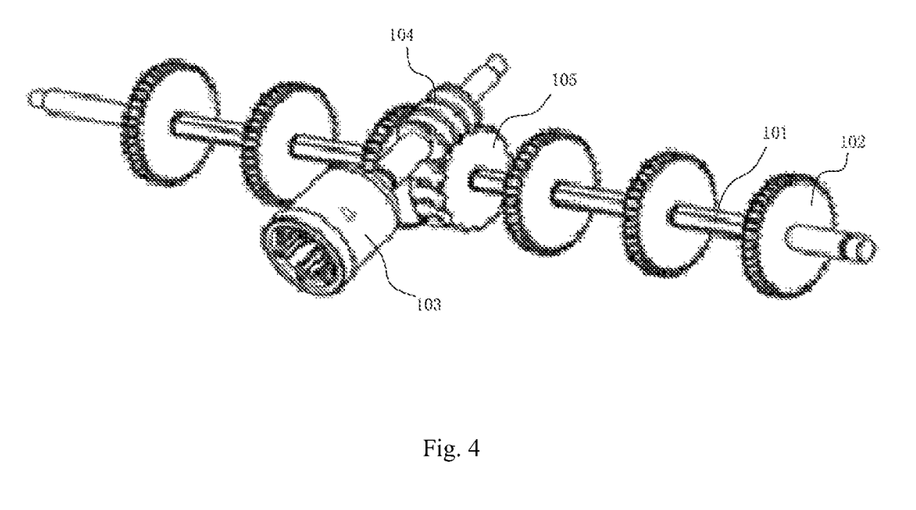
FIG. 4 is a structure diagram of a transmission input portion of the present invention.

Specifically, with reference to FIG. 4, the transmission input portion 100 comprises a driving shaft 101, at least two driving gears 102 and a first driving assembly, the driving gears 102 are evenly distributed at intervals in an axial direction of the driving shaft 101, and each driving gear 102 is fixedly mounted on the driving shaft 101.

The first driving assembly is used to drive the driving shaft 101 to drive all the driving gears 102 mounted on the driving shaft 101 to rotate synchronously. Specifically, in the embodiment, the first driving assembly comprises a first motor 103, a first worm 104 and a first worm wheel 105. An extension direction of a rotating shaft of the first motor 103 is perpendicular to the driving shaft 101, the first worm 104 is connected to the rotating shaft of the first motor 103 or shares the rotating shaft with the first motor 103, and when the first motor 103 drives its rotating shaft to rotate in an axial direction, the first worm 104 rotates synchronously in an axial direction. The first worm wheel 105 is mounted on the driving shaft 101 and is located between the two driving gears 102, the first worm wheel 105 is meshed with the first worm 104, and the first worm wheel 105 is matched with the first worm 104 to realize 90° reversing rotation. That is, after rotation of the first worm 104 is transmitted to the first worm wheel 105, the first worm wheel 105 rotates synchronously in a radial direction, and rotation of the first worm wheel 105 simultaneously drives all the driving gears 102 on the driving shaft 101 to rotate synchronously in a radial direction.

In the embodiment, the driving gear 102 and the first worm wheel 105 are both fixed to the driving shaft 101 through a clamp spring (not shown), and in order to make the driving gear 102, the first worm wheel 105 and the driving shaft 101 rotate synchronously, a cross section of a contact portion between the driving shaft 101 and the driving gear 102 and a cross section of a contact portion between the driving shaft 101 and the first worm wheel 105 are set to be a regular hexagon.

According to the transmission input portion 100 of the present invention, a worm wheel structure is used in power transmission from the first motor 103 to the driving shaft 101, which does not interfere with mounting of the driving gear 102, and enables the driving gear 102 to adjust a position (such as adjusting an interval between the driving gears) and a number as required. Compared with the prior structure which adopts a helical gear to realize transmission, the worm wheel and the worm have low requirements on mounting precision, and prevent skipping to a great extent.

Figure 5:
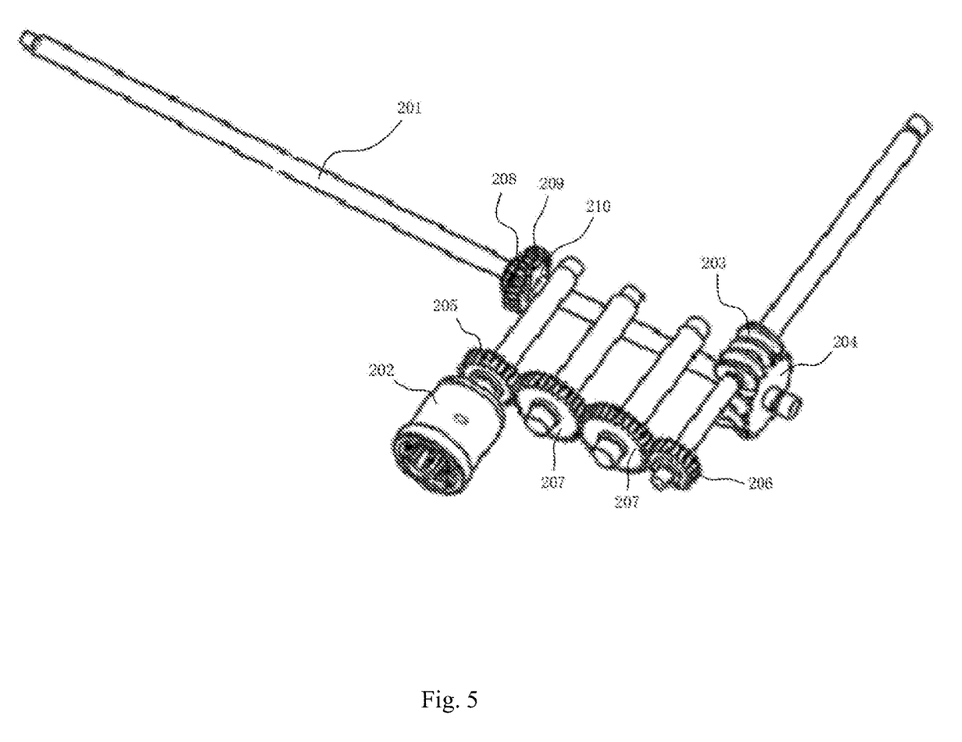
FIG. 5 is a structure diagram of a shift selection portion of the present invention.

With reference to FIG. 5, the shift selection portion 200 specifically comprises a screw rod 201, a second driving assembly and a transmission assembly, the screw rod 201 is parallel to the driving shaft 101, and a surface of the screw rod 201 is provided with an external thread (not shown). The second driving assembly is used to drive the screw rod 201 to rotate in a radial direction, which specifically comprises a second motor 202, a reversing gear set, a second worm 203 and a second worm wheel 204. An extension direction of a rotating shaft of the second motor 202 is perpendicular to both the driving shaft 101 and the screw rod 201, and the second motor 202 drives its rotating shaft to rotate in an axial direction.

The reversing gear set is used to convert axial rotation of the rotating shaft of the second motor 202 into radial rotation. In the embodiment, the reversing gear set comprises a plurality of reversing gears, each reversing gear is fixed on a rotating shaft, an extension direction of each rotating shaft is also perpendicular to both the driving shaft 101 and the screw rod 201. The reversing gears are meshed with each other, and for two outermost reversing gears (for convenience of description hereinafter, the two outermost reversing gears defined here are respectively a leftmost reversing gear 205 and a rightmost reversing gear 206, and a reversing gear located between the leftmost and rightmost reversing gears 205 and 206 is defined as an intermediate reversing gear 207), the leftmost reversing gear 205 is in transmission connection with the rotating shaft of the second motor 202 or shares the rotating shaft with the second motor 202, and the rightmost reversing gear 206 is in transmission connection with the second worm 203. In this way, the rotating shaft of the second motor 202 drives the leftmost reversing gear 205 connected to the rotating shaft to rotate in an axial direction, and then the reversing gear 205 drives the intermediate reversing gear 207 meshed with the reversing gear 205 to rotate in an axial direction, which is transmitted in sequence to the rightmost reversing gear 206 in transmission connection with the second worm 203.

The second worm 203 is connected to a rotating shaft of the rightmost reversing gear 206 or shares the rotating shaft with the rightmost reversing gear 206, and the rightmost reversing gear 206 drives the second worm 203 to rotate synchronously in an axial direction.

The second worm wheel 204 is fixedly mounted on the screw rod 201 and meshed with the second worm 203. In the embodiment, the second worm wheel 204 is fixedly mounted on a right end of the screw rod 201. The second worm wheel 204 is matched with the second worm 203 to realize 90° reversing rotation, that is, after rotation of the second worm 203 is transmitted to the second worm wheel 204, the second worm wheel 204 rotates synchronously in a radial direction, and the second worm wheel 204 drives the screw rod 201 to rotate synchronously while rotating.

The transmission assembly is mounted on the screw rod 201 for sliding in an axial direction of the screw rod 201 under drive of the screw rod 201. Specifically, in the embodiment, the transmission assembly comprises a nut 208 and an idler gear 209, an inner surface of the nut 208 is provided with an internal thread (not shown) matched with the external thread on the screw rod 201, and the screw rod 201 drives the nut 208 to slide in an axial direction thereof while rotating in a radial direction; and the idler gear 209 is mounted on the nut 208 and slides synchronously with the nut 208 in an axial direction of the screw rod 201.

Preferably, one end of the nut 208 is fixed with a wing 210 for limiting relative rotation of the nut 208 and the idler gear 209, the idler gear 209 is sandwiched between the nut 208 and the wing 210, and meanwhile, the wing 210 on the nut 208 also plays a role of a shaft shoulder.

Figure 6:
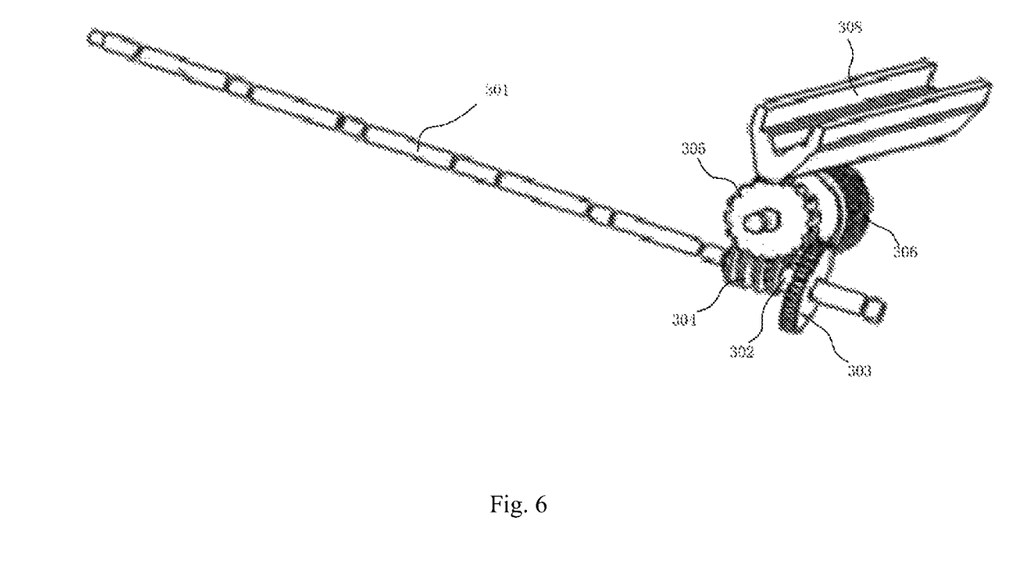
FIG. 6 is a partial structure diagram of a transmission output portion of the present invention.
Figure 7:
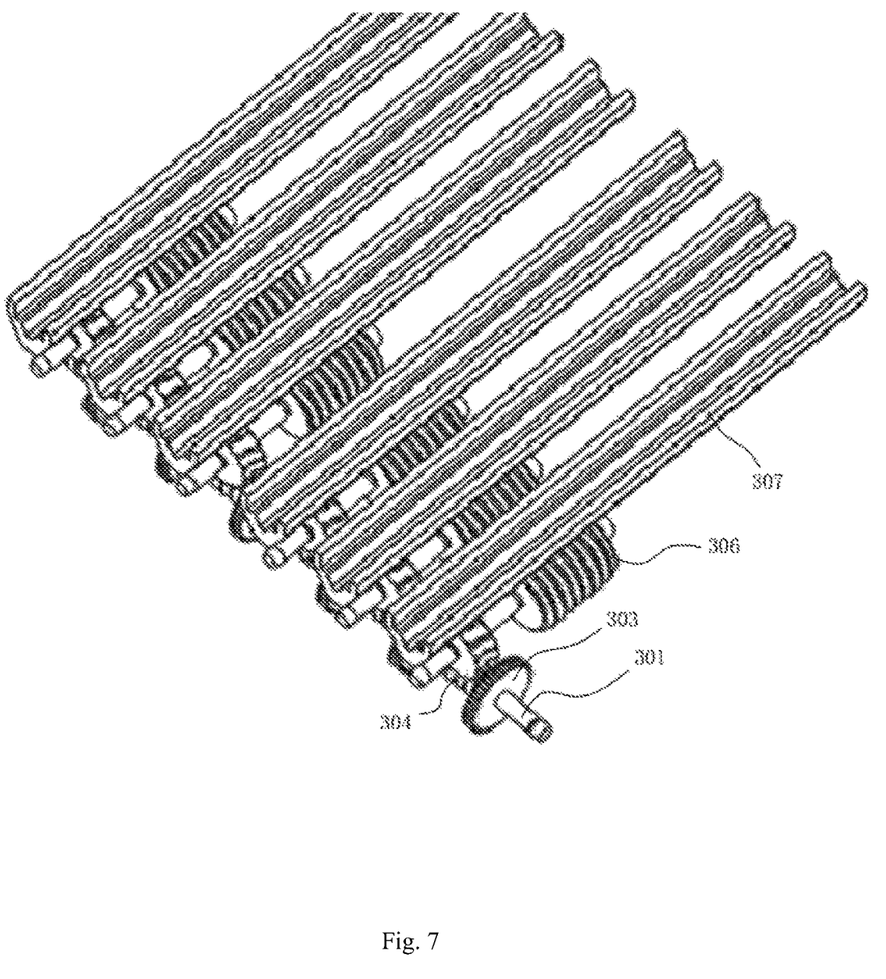
FIG. 7 is an overall structure diagram of the transmission output portion of the present invention.

With reference to FIG. 6 and FIG. 7, the transmission output portion 300 specifically comprises an output shaft 301 and at least two output gear sets 308 mounted on the output shaft 301, the output shaft 301 is non-rotating and is responsible for supporting each output gear set 308, and movements of all output gear sets 308 on the output shaft 301 are independent and do not interfere with each other. The movement of which output gear set 308 depends on a movement position of the idle gear 209 of the shift selection portion. In the embodiment, a positional relationship among the driving shaft 101, the screw rod 201, and the output shaft 301 is that the driving shaft 101, the screw rod 201, and the output shaft 301 are parallel to each other, and the screw rod 201 is located between the driving shaft 101 and the output shaft 301.

Each output gear set 308 comprises a shaft sleeve 302, an output gear 303 and an output assembly, the shaft sleeve 302 is sheathed on the output shaft 301, the output gear 303 is mounted on the shaft sleeve 302, and the output gear 303 corresponds to the driving gear 102 of the transmission input portion one by one (that is, a position and a number of the output gear 303 corresponds to those of the driving gear 102). The output gear 303 drives the shaft sleeve 302 to rotate synchronously. The idle gear 209 of the shift selection portion selects to be meshed with different driving gears 102 and corresponding output gears 303 according to different sliding positions thereof to establish transmission connection and realize selective transmission.

Preferably, all tooth surfaces of the driving gear 102, the output gear 303, and the idler gear 209 of the embodiment are provided with a chamfer to facilitate axial movement meshing of the idler gear 209 with the driving gear 102 and the output gear 303.

Each set of output assemblies comprise a first output worm 304, a first output worm wheel 305, and a second output worm 306, the first output worm 304 is also mounted on the shaft sleeve 302 and rotates synchronously in a radial direction with the shaft sleeve 302. The first output worm wheel 305 is meshed with the first output worm 304 to realize 90° reversing transmission, that is, the first output worm wheel 305 rotates synchronously in an axial direction with the first output worm 304.

The second output worm 306 is in transmission connection with the first output worm wheel 305, which can share a rotating shaft with the first output worm wheel 305 or a rotating shaft of the second output worm 306 is connected to the rotating shaft of the first output worm wheel 305, and an extension direction of the rotating shaft of the first output worm wheel 305 is perpendicular to the output shaft 301. Rotation of the first output worm wheel 305 is transmitted to the second output worm 306, which drives the second output worm 306 to rotate synchronously in an axial direction.

Each second output worm 306 is also provided with a rack 307 meshed with the second output worm 306, the rack 307 has helical teeth and is connected to a phase shifter, and the rack 307 rotates synchronously in an axial direction with the second output worm 306, thereby driving the phase shifter connected to the rack 307 to move and adjust a phase position thereof.

In addition, the transmission device for the antenna phase shifter of the embodiment is integrally mounted on a shell 400, and the shell 400 plays a role in supporting and mounting assemblies of various portions.

According to the present invention, two motors are responsible for power input and selection output respectively, any number of the phase shifters are selectively driven, the present invention is compact in structure, the output terminal of the transmission output portion may be spread out flat, and an output quantity can be increased or decreased as needed. In addition, the whole reversing structure is driven by the worm wheel and the worm, which reduces mounting requirements, and a whole transmission process is transmitted from the worm to the worm wheel, thereby increasing a reverse transmission resistance. Finally, the output portion changes rotation into translation through a connection mode of the worm and an infinite worm wheel to prevent skipping, and at the same time, the transmission from the worm wheel to the worm has self-locking protection to prevent reverse transmission, thereby preventing a position change of the phase shifter.

The technical contents and technical features of the present invention have been disclosed above, but those skilled in the art may still make various replacements and modifications without deviating from the spirit of the present invention based on the instruction and disclosure of the present invention. Therefore, the protection scope of the present invention shall comprise various replacements and modifications without deviating from the present invention instead of being limited to the contents disclosed by the embodiments, and shall be covered by the claims of the application of the patent.

The invention claimed is:

1. A transmission device for an antenna phase shifter, comprising a transmission input portion, a shift selection portion and a transmission output portion, wherein:
    the transmission input portion comprises a driving shaft, at least two driving gears axially and fixedly mounted on the driving shaft, and a first driving assembly in transmission connection with the driving shaft;
    the shift selection portion comprises a screw rod, a transmission assembly mounted on the screw rod and a second driving assembly in transmission connection with the screw rod;
    the transmission output portion comprises an output shaft and at least two output gear sets mounted on the output shaft, one output gear set corresponds to one driving gear on the driving shaft;
    the first driving assembly drives the driving gear on the driving shaft to rotate synchronously, the second driving assembly drives the screw rod to rotate, the transmission assembly slides along an axial direction of the screw rod under drive of the screw rod and selects any driving gear on the driving shaft to establish transmission connection with one corresponding output gear set on the output shaft;
    the first driving assembly comprises a first motor, a first worm connected to the first motor and a first worm wheel meshed with the first worm, the first worm wheel is fixedly mounted on the driving shaft, the first motor drives the first worm to drive the first worm wheel to rotate, the first worm wheel drives the driving shaft to drive the driving gear to rotate synchronously, and a transmission from the first worm wheel to the first worm has self-locking protection to prevent reverse transmission; and
    the second driving assembly comprises a second motor, a second worm in transmission connection with the second motor and a second worm wheel meshed with the second worm, the second worm wheel is fixedly mounted on the screw rod, the second motor drives the second worm to rotate, the second worm drives the second worm wheel to drive the screw rod to rotate, and a transmission from the second worm wheel to the second worm has self-locking protection to prevent reverse transmission.

2. The transmission device for the antenna phase shifter according to claim 1, wherein the second driving assembly further comprises a reversing gear set, the reversing gear set comprises a plurality of reversing gears, the reversing gears are meshed with each other, one of two outermost reversing gears is in transmission connection with the second motor, and the other is in transmission connection with the second worm.

3. The transmission device for the antenna phase shifter according to claim 1, wherein each output gear set of the transmission output portion moves independently.

4. The transmission device for the antenna phase shifter according to claim 1, wherein the output gear set comprises a shaft sleeve sheathed on the output shaft, an output gear mounted on the shaft sleeve and an output assembly in transmission connection with the output gear, the output gear corresponds to the driving gear of the transmission input portion, and the shaft sleeve rotates synchronously with the output gear.

5. The transmission device for the antenna phase shifter according to claim 4, wherein the output assembly comprises a first output worm mounted on the shaft sleeve, a first output worm wheel meshed with the first output worm, and a second output worm in transmission connection with the first output worm wheel; and the first output worm rotates synchronously with the shaft sleeve, the first output worm drives the first output worm wheel to rotate, and the first output worm wheel drives the second output worm to rotate.

6. The transmission device for the antenna phase shifter according to claim 5, wherein each second output worm is provided with a rack meshed with the second output worm, and the rack has helical teeth and is connected to a phase shifter.

7. The transmission device for the antenna phase shifter according to claim 4, wherein the transmission assembly comprises a nut fixedly mounted on the screw rod and an idler gear mounted on the nut, the idler gear slides along an axial direction of the screw rod under drive of the nut, and selects to be simultaneously meshed with any driving gear on the driving shaft and the corresponding output gear on the output shaft to establish transmission connection.

8. The transmission device for the antenna phase shifter according to claim 7, wherein one end of the nut is provided with a wing for limiting relative rotation of the nut and the idler gear.

9. The transmission device for the antenna phase shifter according to claim 7, wherein all tooth surfaces of the idler gear are provided with a chamfer.

10. The transmission device for the antenna phase shifter according to claim 1, wherein the screw rod is located between the driving shaft and the output shaft, and the screw rod, the driving shaft and the output shaft are all parallel to each other.

11. The transmission device for the antenna phase shifter according to claim 1, wherein all tooth surfaces of the driving gear and the output gear are provided with a chamfer.

12. The transmission device for the antenna phase shifter according to claim 1, wherein a surface of the screw rod is provided with an external thread.

13. The transmission device for the antenna phase shifter according to claim 1, wherein the transmission input portion, the shift selection portion and the transmission output portion are mounted in a shell.

14. The transmission device for the antenna phase shifter according to claim 1, wherein:
the first worm is connected to the first motor through a first motor shaft;
the screw rod and the drafting shaft are substantially parallel to each other; and
viewing from a vertical direction perpendicular to the driving shaft and the first motor shaft, the driving shaft extends to be located on both sides of the first worm, the first motor shaft extends to be located on both sides of the first worm wheel, and the screw rod extends to be located on both sides of the second worm.

15. A transmission device for an antenna phase shifter, comprising a transmission input portion, a shift selection portion and a transmission output portion, wherein:
the transmission input portion comprises a driving shaft, at least two driving gears axially and fixedly mounted on the driving shaft, and a first driving assembly in transmission connection with the driving shaft;
the shift selection portion comprises a screw rod, a transmission assembly mounted on the screw rod and a second driving assembly in transmission connection with the screw rod;
the transmission output portion comprises an output shaft and at least two output gear sets mounted on the output shaft, one output gear set corresponds to one driving gear on the driving shaft;
the first driving assembly drives the driving gear on the driving shaft to rotate synchronously, the second driving assembly drives the screw rod to rotate, the transmission assembly slides along an axial direction of the screw rod under drive of the screw rod and selects any driving gear on the driving shaft to establish transmission connection with one corresponding output gear set on the output shaft;
the output gear set comprises a shaft sleeve sheathed on the output shaft, an output gear mounted on the shaft sleeve and an output assembly in transmission connection with the output gear, the output gear corresponds to the driving gear of the transmission input portion, and the shaft sleeve rotates synchronously with the output gear; and
the transmission assembly comprises a nut fixedly mounted on the screw rod and an idler gear mounted on the nut, the idler gear and the nut are co-axially mounted on the screw rod, the idler gear slides along an axial direction of the screw rod under drive of the nut, and selects to be simultaneously meshed with any driving gear on the driving shaft and the corresponding output gear on the output shaft to establish transmission connection.

16. The transmission device for the antenna phase shifter according to claim 1, wherein viewing from a vertical direction perpendicular to the screw rod, the screw rod extends to be located on both sides of the second worm.

17. The transmission device for the antenna phase shifter according to claim 16, wherein the first driving assembly comprises a first motor, a first worm connected to the first motor and a first worm wheel meshed with the first worm, the first worm wheel is fixedly mounted on the driving shaft, the first motor drives the first worm to drive the first worm wheel to rotate, the first worm wheel drives the driving shaft to drive the driving gear to rotate synchronously, and a transmission from the first worm wheel to the first worm has self-locking protection to prevent reverse transmission.

18. The transmission device for the antenna phase shifter according to claim 16, wherein the second driving assembly comprises a second motor, a second worm in transmission connection with the second motor and a second worm wheel meshed with the second worm, the second worm wheel is fixedly mounted on the screw rod, the second motor drives the second worm to rotate, the second worm drives the second worm wheel to drive the screw rod to rotate, and a transmission from the second worm wheel to the second worm has self-locking protection to prevent reverse transmission.

19. The transmission device for the antenna phase shifter according to claim 18, wherein the second driving assembly further comprises a reversing gear set, the reversing gear set comprises a plurality of reversing gears, the reversing gears are meshed with each other, one of two outermost reversing gears is in transmission connection with the second motor, and the other is in transmission connection with the second worm.

20. The transmission device for the antenna phase shifter according to claim 16, wherein one end of the nut is provided with a wing for limiting relative rotation of the nut and the idler gear.

21. The transmission device for the antenna phase shifter according to claim 16, wherein all tooth surfaces of the idler gear are provided with a chamfer.

* * * * *